United States Patent

Pinschmidt et al.

[11] Patent Number: 6,145,643
[45] Date of Patent: Nov. 14, 2000

[54] HOUSING FOR A MULTIPLE-DISC CLUTCH

[75] Inventors: Udo Pinschmidt, Gölbe-Schönstadt; Werner Selzam, Wipfeld; Thomas Rudolf, Dettlebach; Horst Friedrich, Aidhausen/Happertshausen; Claus Orth, Mönchstockeim; Klaus Hofmann, Leutershausen, all of Germany

[73] Assignee: Sachs Race Engineering GmbH, Schweinfurt, Germany

[21] Appl. No.: 09/330,289

[22] Filed: Jun. 11, 1999

[30] Foreign Application Priority Data

Jun. 19, 1998 [DE] Germany ............... 198 27 342

[51] Int. Cl.⁷ ............... F16D 13/50; F16D 13/44
[52] U.S. Cl. ............... 192/70.27; 192/89.23; 192/70.28; 192/70.16
[58] Field of Search ............... 192/70.27, 70.16, 192/70.13, 89.24, 89.23

[56] References Cited

U.S. PATENT DOCUMENTS

| | | | |
|---|---|---|---|
| 5,048,654 | 9/1991 | Yesnik | 192/70.14 |
| 5,261,517 | 11/1993 | Hering | 192/91 A |
| 5,617,941 | 4/1997 | Takahashi et al. | 192/107 R |
| 5,896,970 | 4/1999 | Prater | 192/70.2 |
| 5,960,921 | 10/1999 | Hofmann et al. | 192/70.27 |

FOREIGN PATENT DOCUMENTS

| | | | |
|---|---|---|---|
| 0 710 766 A1 | 5/1996 | European Pat. Off. | F01D 11/00 |
| 0 710 776 A3 | 5/1996 | European Pat. Off. | F16D 13/38 |
| 93 162 | 8/1896 | Germany . | |
| 21 25 870 B2 | 12/1972 | Germany | F16D 13/68 |
| 34 45 333 A1 | 7/1985 | Germany | F16D 13/52 |
| 39 36 871 A1 | 5/1990 | Germany | F16M 1/026 |
| 195 45 972 A1 | 6/1997 | Germany | F16D 13/60 |
| 6-50352 | 2/1994 | Japan | F16D 13/60 |
| 6-74251 | 3/1994 | Japan | F16D 13/60 |
| 7-42758 | 2/1995 | Japan | F16D 13/60 |
| 7-310757 | 11/1995 | Japan | F16D 13/71 |

Primary Examiner—Charles A. Marmor
Assistant Examiner—Tisha D. Waddell
Attorney, Agent, or Firm—Cohen, Pontani, Lieberman & Pavane

[57] ABSTRACT

A housing for a multiple-disc clutch includes a toothed ring having a plurality of disc-driving teeth arranged on an inner circumferential surface of the same so as to be distributed in the circumferential direction and extending in a ring longitudinal direction. A flywheel is connected to a first end of the toothed ring for common rotation and a cover is connected to a second end the toothed ring for common rotation. At least one component of the cover and flywheel is connected to the toothed ring by a fastening arrangement that does not include fastening bolts.

15 Claims, 3 Drawing Sheets

HOUSING FOR A MULTIPLE-DISC CLUTCH

BACKGROUND OF THE INVENTION

1. Field of the Invention

The present invention relates to clutch devices in motor vehicles, and more particularly, to a housing for a multiple-disc clutch.

2. Description of the Related Art

DE 195 45 972 A1 discloses a multiple-disc clutch in which openings are provided in a plurality of disc-driving teeth. These openings pass axially through the teeth. Corresponding openings are provided in the cover and/or in the flywheel, so that, to assemble the housing for this known multiple-disc clutch, fastening bolts can be passed through the openings, which are then axially aligned, in the flywheel, in the teeth of the toothed ring and in the cover. These three components can therefore be joined together to form a housing by screwing a nut onto the fastening bolts.

In multiple-disc clutches, which are generally used in the racing sector, it is necessary to design this clutch to be as light as possible and with the lowest possible moment of inertia. The use of fastening bolts, i.e. screws or anti-fatigue screws, for holding the housing together conflicts with this requirement, since these screws have to be made of very solid material in order to be able to provide the required strength of the housing. In addition, since the screws also lie in the radially outer region of the housing, they contribute to the increase in the mass moment of inertia to an undesirably high degree.

SUMMARY OF THE INVENTION

It is therefore the object of the present invention to provide a housing for a multiple-disc clutch of a motor vehicle, which is capable of being constructed with the lowest possible mass and the lowest possible moment of inertia and in addition can be easily assembled and dismantled.

According to the invention, this and other objects are achieved by a housing for a multiple-disc clutch of a motor vehicle, comprising: a toothed ring having a plurality of disc driving teeth arranged on an inner circumferential surface of the same so as to be distributed in the circumferential direction and extending in a ring longitudinal direction; a flywheel connected to a first end of the toothed ring for common rotation; a cover connected to a second end of the toothed ring for common rotation; and at least one component of the cover and the flywheel being connected to the toothed ring by a fastening arrangement. The fastening arrangement comprises a circumferential coupling region for producing a rotationally fixed coupling between the toothed ring and the at least one component and an axial coupling region for producing an axially fixed coupling between the toothed ring and the one component.

Furthermore, in the housing according to the invention, provision is made for the circumferential coupling region to comprise circumferential retaining sections. These retaining sections are provided on the toothed ring on the one hand and on the at least one component on the other hand. They bear against one another or can be brought to bear against one another in the circumferential direction. The axial coupling region comprises a retaining ring engaging or arranged on the toothed ring and preventing the axial movement of the at least one component relative to the toothed ring.

In the housing according to the invention, the function of the mutual fastening of the at least one component and the toothed ring is performed by the retaining ring, in which case, by additional measures, provision is made for obtaining a rotationally fixed coupling of these two units or components. The mass, and thus the moment of inertia, are reduced by the omission of relatively heavy screws and by the use of a comparatively light retaining ring. At the same time, the manufacturing costs can be reduced. As a result of the provision of a rotationally fixed coupling in the circumferential direction, the very stringent requirement, which predominates in racing, with regard to production accuracy is taken into account. Thus, a situation in which an undesirable rotation of, for example, the cover relative to the toothed ring, resulting in corresponding wear in the bearing region of these components, can be avoided so that once the dimensional quantities we provided, the various components also cannot be impaired in operation.

In order to obtain a reliable axial coupling of the two components in both directions, it is proposed that the axial coupling region also have an axial bearing region. The axial bearing region is formed on the toothed ring and on which the at least one component bears with a first axial bearing side of the same. The retaining ring bears against a second axial bearing side of the at least one component.

The circumferential coupling region may comprise at least one aperture in the at least one component, in which aperture a disc-driving tooth of the toothed ring engages.

For example, provision may be made for at least one disc-driving tooth to project axially beyond a marginal region, forming the axial bearing region of the toothed ring and pass through a through-opening forming the at least one aperture in the one component.

In this case, in order to simplify the housing according to the invention, provision is then preferably made for a retaining-ring location groove to be formed in the at least one disc-driving tooth in a region of the same projecting beyond the through-opening.

In order to keep the overall size of the housing according to the invention as small as possible, it is proposed that the retaining-ring location groove be open radially to the inside. Provision may therefore be made to ensure that the retaining ring does not project radially outward to an excessive degree.

In order to be able to provide a sufficiently fixed rotary coupling between the one component and the toothed ring, it is proposed that at least every second disc-driving tooth pass through an associated through-opening in the one component.

In an alternative embodiment, the axial bearing region may be formed by at least some of the disc-driving teeth.

In such a design, in order to provide the rotary-coupling function, the at least one aperture in the at least one component may at the same time be open radially to the outside, and a disc-driving tooth which has a greater axial extent than the disc-driving teeth forming the axial bearing region may engage in this at least one aperture.

In this case, in order to simplify the construction, provision is then also preferably made for a retaining-ring location groove to be formed in a region of the toothed ring which axially extends beyond the at least one component.

In order to also obtain a very robust rotary connection between the two units to be connected to one another in such a design of the housing according to the invention, it is proposed that at least every second disc-driving tooth engage in an associated aperture in the at least one component.

In order to be able to obtain a very accurate positional allocation of the at least one component on the one hand and the toothed ring on the other hand in the radial direction relative to one another, it is proposed that radial coupling means also be provided for securing the one component to the toothed ring so as to counter radial movement relative to the toothed ring.

These radial coupling means on the toothed ring or the at least one component, may comprise an axial projection, preferably continuously encircling in the circumferential direction, and, on the at least one component or the toothed ring respectively, an axial offset, which, in a preferred embodiment, continuously encircles in the circumferential direction and against which the axial projection bears radially on the outside or/and radially on the inside.

Alternatively, it is possible for the radial coupling means, in at least some of the disc-driving teeth forming the axial bearing region, to comprise an axial projection or an axial recess, with which a complementary axial recess or a complementary axial projection respectively on the at least one component engages.

The retaining ring is preferably an elastically deformable retaining ring preloaded in a retaining position.

The various features of novelty which characterize the invention are pointed out with particularity in the claims annexed to and forming a part of the disclosure. For a better understanding of the invention, its operating advantages, and specific objects attained by its use, reference should be had to the drawing and descriptive matter in which there are illustrated and described preferred embodiments of the invention.

BRIEF DESCRIPTION OF THE DRAWINGS

The invention is described in detail below with reference to preferred embodiments and the attached drawings, in which.

DETAILED DESCRIPTION OF THE PRESENTLY PREFERRED EMBODIMENTS

Figure 5:
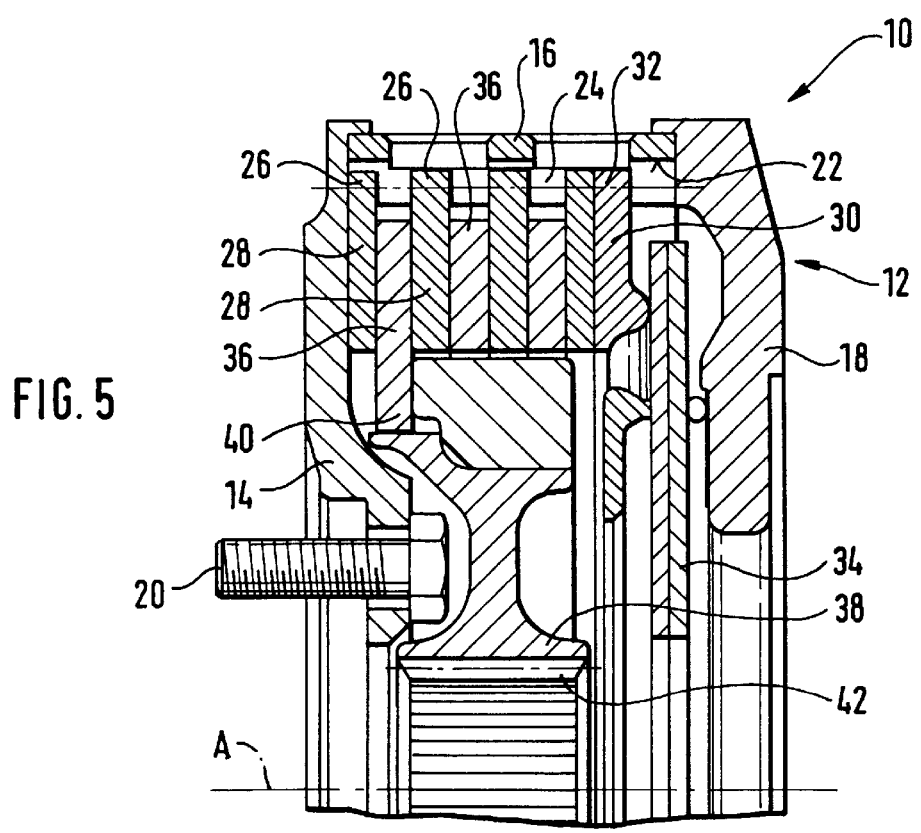
FIG. 5 is a partial longitudinal sectional view which shows the basic construction of a multiple-disc clutch.

Before the details of the present invention are considered, the construction of a multiple-disc clutch will be described in general with reference to FIG. 5, specifically a pushed clutch being shown in this case.

A multiple-disc clutch 10 comprises a housing generally designated by 12 and formed from a flywheel 14, a toothed ring 16 and a cover 18. The flywheel 14 may be bolted to a drive shaft, for example a crankshaft of an internal combustion engine, by a plurality of screw bolts 20, so that the housing 12, driven by this drive shaft after integration in the drive system, will rotate about the rotary axis A.

The toothed ring 16 has a plurality of disc-driving teeth 24, which are distributed in the circumferential direction on an inner circumferential surface 22 of the toothed ring 16 and extend in a ring longitudinal direction, which corresponds to the extension direction of the axis A. Respective outer tooth systems 26 of outer discs 28, of which four can be seen in FIG. 5, mesh with the disc-driving teeth 24. These outer discs 28 are therefore connected to the housing 12 in a rotationally fixed manner but are displaceable relative to the latter in the axial direction.

Furthermore, a pressure plate 30, via a corresponding outer tooth system 32, is connected to the housing 12 in a rotationally fixed manner but is displaceable in the axial direction. Acting between the pressure plate 30 and the cover 18 is an energy storage mechanism, here in the form of a diaphragm spring 34, which is held on the cover 18 via distance bolts (not shown) in a manner known per se. In its radially outer region, the diaphragm spring 34 presses against the pressure plate 30, so that the latter in turn presses the outer discs 28 together with inner discs 36, arranged in each case between the outer discs, in the direction toward the flywheel 14. By the applied pressure, a torque-transmission connection is produced between the outer discs 26, connected to the housing 12 in a rotationally fixed manner, and the inner discs 36, which are connected to a hub 38 in a rotationally fixed manner. For this purpose, the inner discs 36 each have an inner tooth system 40, which meshes with a corresponding outer tooth system of the hub 38. Furthermore, the hub 38 has an inner tooth system 42, through which the hub 38 can be brought into rotary engagement with a clutch output shaft, in general a transmission input shaft.

The construction of the multiple-disc clutch 10 described above is generally known, and it may be pointed out that a multiplicity of modifications may be made to this construction with regard to the configuration, the number and the positioning of the individual components, in particular the outer and inner discs respectively, the configuration of the energy storage mechanism, etc. The principles of the present invention can be applied irrespective of the variation in the multiple-disc clutch in these regions. In particular, it may be pointed out that the clutch shown in FIG. 5 may be changed into a pulled clutch in a simple manner by the diaphragm spring 34 being supported on the housing in its radially outer region, i.e. the region projecting beyond the seating on the pressure plate 30, and by thereby pressing the pressure plate 30 in the direction of the flywheel 14 by means of its region lying radially further to the inside.

Figure 1:
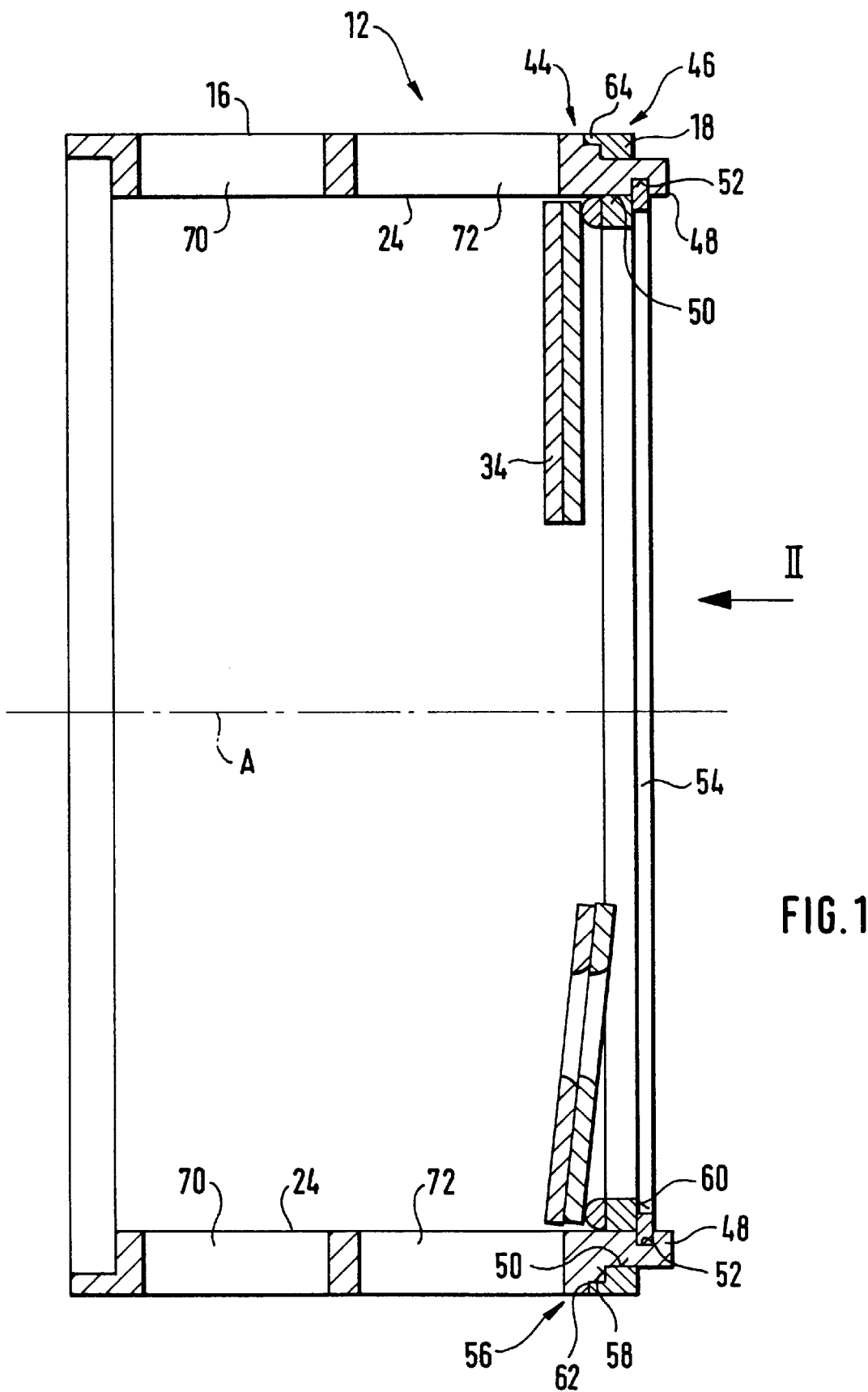
FIG. 1 is a longitudinal sectional view through a toothed ring connected to a cover taken along line I—I in FIG. 2.

FIG. 1 shows coupling of the cover 18 to the toothed ring 16 in a manner according to the invention. It may be pointed out that that the flywheel 14 may be also attached to the toothed ring 16 in this manner, instead of or in addition to the cover 18; the same also applies to the embodiment shown in FIGS. 3 and 4. Furthermore, it is pointed out that an embodiment which is intended for use in a pulled clutch (the diaphragm spring 34 is shown in the engaged position in the top part and in the disengaged position in the bottom part) is shown in FIG. 1; it is self-evident that the type of connection according to the invention between the two units may also be used in a pushed clutch shown in FIG. 5.

Figure 2:
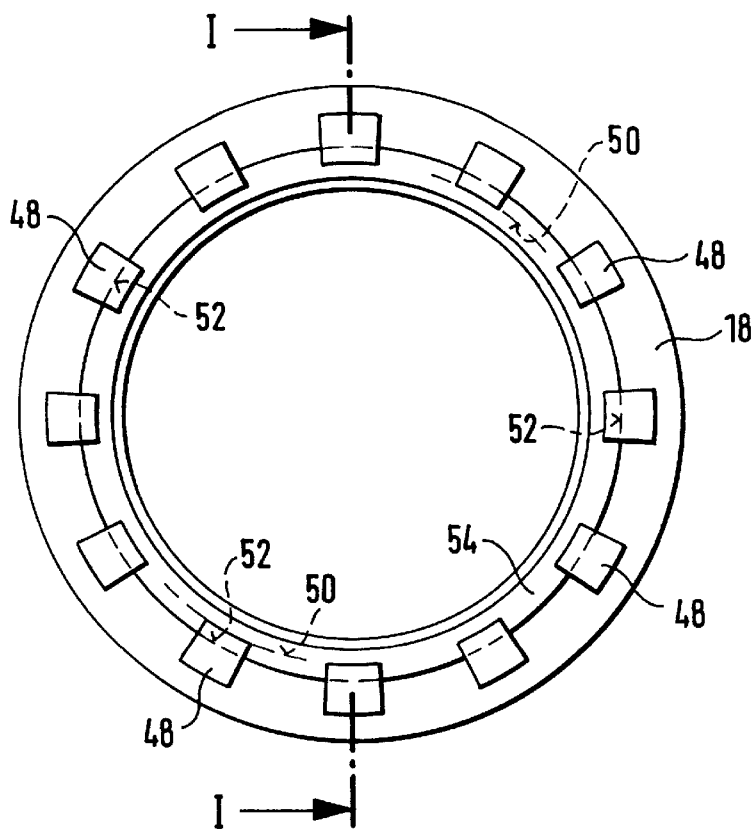
FIG. 2 is an axial view of the toothed ring with the cover attached thereto by a retaining ring in the direction of view II shown in FIG. 1.

It will be seen in FIGS. 1 and 2 that the disc-driving teeth 24, in the end region 44 in which the cover 18 is to be connected to the toothed ring 16, are axially extended beyond a marginal region 46 of the toothed ring 16 (i.e. they have extension regions 48). The cover 18 has through-openings 50, which are assigned to the extension regions 48, which pass through said through-openings 50. In particular, the through-openings 50 are openings which are enclosed all round and which completely surround the extension regions 48. A groove 52 which is open radially to the inside is formed in each of the extension regions 48, and an elastic retaining ring 54, also called a circling lock ring, can catch or spring into said groove 52 after these regions 48 have been inserted into the openings 50 in the cover 18 to such an extent that the grooves 52 emerge from the openings 50. Retaining ring 54 may be, for example, a ring which is open in the circumferential direction and which is slightly compressed in order to be inserted into the grooves 52 and is relaxed after axial alignment with the grooves 52.

Formed in the marginal region 46 of the toothed ring 16 is an axial bearing region 56, on which the cover 18 then bears with a first axial bearing side 58. The retaining ring 54 bears against a second axial bearing side 60 of the cover 18, so that the cover 18 is held in place on the toothed ring 16 in both axial directions, i.e. in both extension directions of the rotary axis A. It will be seen that an offset or a recess 62 is formed on the toothed ring 16 in the axial bearing region, and a corresponding axial projection 64 on the cover 18 engages in this recess 62. Provision is therefore made for radial centering of the cover 18 on the toothed ring 16. This radial centering may also be additionally assisted by a correspondingly accurate fit—formed between the extended regions 48 and the openings 50. It will be seen that the following measures are taken for housing 12 according to the invention:

1. An axial coupling between the toothed ring 16 and the cover 18 is provided by the retaining ring 54 on the one hand and the axial bearing region 56 on the toothed ring 16 on the other hand.
2. Rotationally fixed coupling of the cover 18 to the toothed ring 16 is provided by the extended regions 48, engaging in the openings 50 in the cover 18, of the disc-driving teeth 24.
3. Radial centering for the cover 18 on the toothed ring 16 is provided by the axial projection 64 engaging in the recess 62, and this centering is additionally assisted by the extension regions 48 engaging in the openings 50.

Coupling of the cover 18 to the toothed ring 16 in such a way as to act firmly in all motion and coupling directions is therefore provided in a simple manner, in which case a marked reduction in the weight and the moment of inertia of a housing of a multiple-disc clutch can be obtained due to the omission of all fastening screws in connection with the prior art It will be seen in FIG. 1 that radial through-openings 70, 72 are provided in the region of the disc-driving teeth 24, and these radial through-openings 70, 72 help to further save weight on the one hand and permit good ventilation of the housing 12 on the other hand.

Such a configuration of the coupling of the cover 18 to the toothed ring 16 is especially advantageous when, for example, the flywheel 14 is connected to the toothed ring 16 in a firm and non-detachable manner by welding or the like. Due to the coupling, of the cover 18 to the toothed ring 16 described above, the multiple-disc clutch may then be assembled in a simple manner or it may then be serviced in a simple manner. Nonetheless, it may be pointed out once again that the flywheel may also be connected to the toothed ring 16 in the manner described above.

In the case of the embodiment described with reference to FIGS. 1 and 2, various modifications may be made. Thus the axially extended regions 48 may be provided at different regions from the regions of the toothed ring 16 which are aligned with the disc-driving teeth 24. However, the regions shown are preferred, since with the extension of the disc-driving teeth 24, a robust design of these extended regions 48 can be obtained at the same time. The radial coupling may also be provided by other measures, for example by a groove in which a projection on the respectively other unit or component engages. Also, not all the disc-driving teeth 24 need be axially extended; for example robust coupling of the cover 18 to the toothed ring 16 may also be obtained if only every other or second disc-driving tooth contributes to the coupling of the cover 18 to the toothed ring 16.

Figure 3:
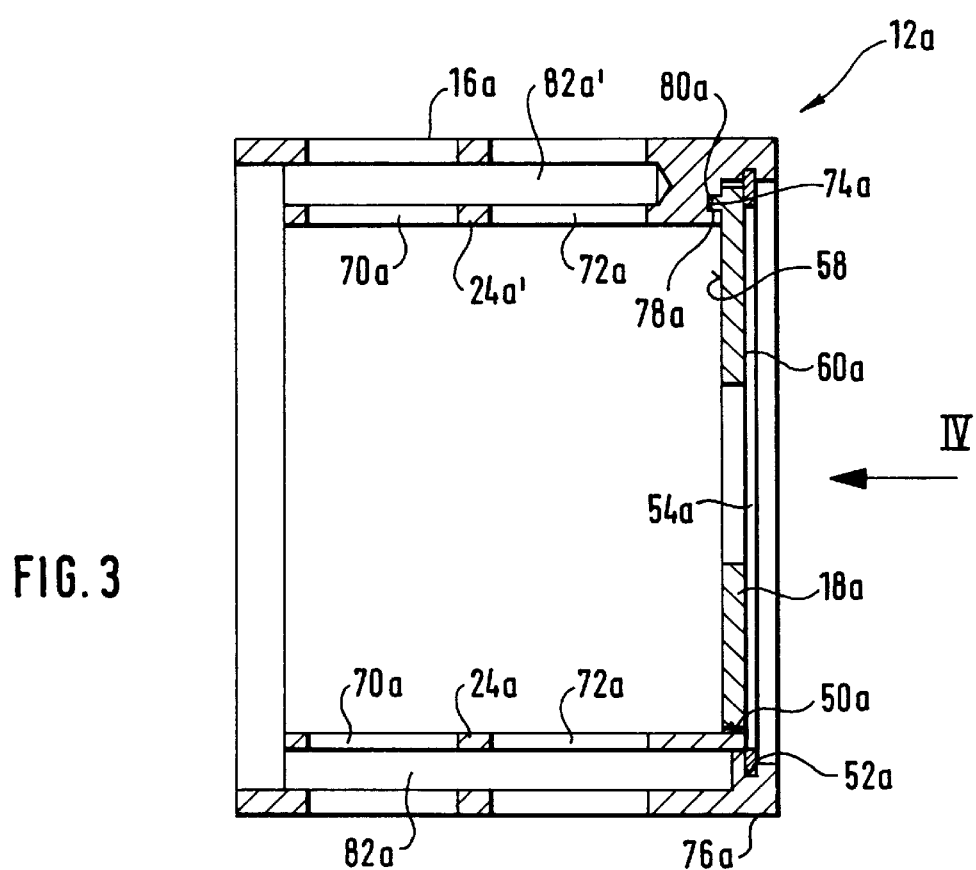
FIG. 3 is a cross sectional view of an alternative embodiment of a toothed ring connected to a cover taken along line III—III in FIG. 4.
Figure 4:
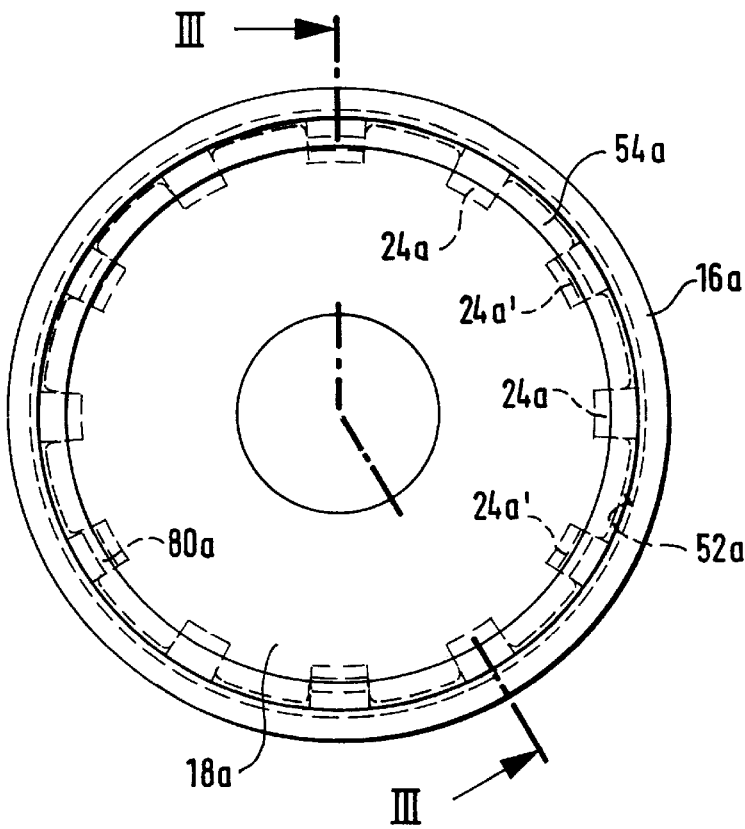
FIG. 4 is an axial view of the embodiment shown in FIG. 3 in direction of view IV shown in FIG. 3.

FIGS. 3 and 4 show an alternative embodiment of the multiple disc clutch according to the invention Components which correspond in function and construction to the components described with reference to FIGS. 1 and 2 are designated by the same reference numeral with the addition of the letter "a".

In the embodiment according to FIG. 3, the disc-driving teeth 24a and 24a' respectively, which follow one another in the circumferential direction, are designed to differ in an alternate manner. As can be seen in FIG. 3, the disc-driving teeth 24a, in the region of the end 44a of the toothed ring 16a, have a greater axial extent than the disc-driving teeth 24a'. The cover 18a has an aperture 50a, which is assigned to each disc-driving tooth 24a and is open radially to the outside. This can be seen in the axial view of FIG. 4 at the circumferential contouring of the cover 18a depicted by a short-dash line. The other disc-driving teeth 24a', with their axial end faces 74a, form an axial bearing region of the toothed ring 16a, on which the cover 18a bears with its first axial bearing side 58a. Furthermore, an annular region 76a, projecting axially beyond the disc-driving teeth 24a and 24a' of the toothed ring 16a, is provided radially outside the cover 18a, in which region a circumferential groove 52a which is open radially to the inside is provided. Engaging in this circumferential groove is a retaining ring 54a, which also bears against the second axial bearing surface 60a of the cover 18a. The cover 18a is therefore held axially between the axial end faces 74a of the disc-driving teeth 24a' and the retaining ring 54a. In the circumferential direction, the rotary connection between the cover 18a and the toothed ring 16a is provided by the disc-driving teeth 24a engaging in the aperture 50a.

The radial centering and/or retention of the cover 18a relative to the toothed ring 16a is formed by virtue of the fact that a groove 78a is formed in the disc-driving teeth 24a', which in each case form the axial bearing for the cover 18a at the end faces 74a, and a corresponding axial projection 80a on the cover 18a engages in this groove 78a. The radial centering is additionally assisted by the annular region 76a of the toothed ring 16a and by the bearing of the cover 18a against the axially extended disc-driving teeth 24a.

It will be seen that, in the embodiment according to FIG. 3, the disc-driving teeth are also open radially to the inside and outside respectively due to openings 70a and 72a and they also have axial through-openings 82a and 82a' respectively, so that further weight may be saved here. In this case, it should be noted that those disc-driving teeth 24a' which form the axial bearing region for the cover 18a have truncated openings 82a' in order to be able to provide as large a bearing area as possible for the cover 18a.

In all the embodiments described above, provision is made to ensure that coupling means which act in a positive-locking manner are provided in each coupling direction, i.e. in the radial direction, the circumferential direction and the axial direction, and these coupling means provide a reliable motion coupling of the components connected to one another irrespective of shocks or spontaneous rotary-speed changes occurring in operation.

The invention is not limited by the embodiments described above which are presented as examples only but can be modified in various ways within the scope of protection defined by the appended patent claims.

We claim:

1. A housing for a multiple-disc clutch of a motor vehicle comprising:

a tooth ring (16; 16a) having a first end, a second end, an inner circumferential surface (22) and a plurality of disc-driving teeth (24; 24a, 24b) arranged on said inner circumferential surface (22) so as to be distributed in a circumferential direction and extending in a ring longitudinal direction;

a flywheel (14) connected to said toothed ring (16, 16a) at said first end for common rotation therewith;

a cover (18; 18a) connected to said toothed ring (16, 16a) at said second end (44; 44a) for common rotation therewith; and fastening means for connecting at least one component of said cover (18; 18a) and said flywheel (14) to said toothed ring, said fastening means comprising:

a circumferential coupling region (48, 50, 24a, 50a) for producing a rotationally fixed coupling between the toothed ring (16; 16a) and said at least one component of said cover and said flywheel, said circumferential coupling region (48, 50, 24a, 50a) comprises circumferential retaining sections (48, 50, 24a, 50a), said circumferential retaining sections comprising an extension of at least one of said plural disc-driving teeth provided on said toothed ring (16; 16a) and an aperture arranged in said at least one component of said cover and said flywheel, said circumferential retaining sections for bearing against one another in the circumferential direction so that said extension of said at least one of said plural disc-diving teeth is inserted through said aperture; and an axial coupling region (54; 54a) for producing an axially fixed coupling between the toothed ring and said at least one component of said cover and said flywheel, said axial coupling region (54; 54a) comprising a retaining ring (54, 54a) adapted to engage said extension of said at least one of said plural disc-driving teeth of said tooth ring (16; 16a) inserted through said aperture and thereby prevent axial movement of said at least one component of said cover and said flywheel relative to said toothed ring.

2. A housing for a multiple-disc clutch of a motor vehicle comprising:

a tooth ring (16; 16a) having a first end, a second end, an inner circumferential surface (22) and a plurality of disc-driving teeth (24; 24a, 24b) arranged on said inner circumferential surface (22) so as to be distributed in a circumferential direction and extending in a ring longitudinal direction;

a flywheel (14) connected to said toothed ring (16, 16a) at said first end for common rotation therewith;

a cover (18; 18a) connected to said toothed ring (16, 16a) at said second end (44; 44a) for common rotation therewith; and fastening means for connecting at least one component of said cover (18; 18a) and said flywheel (14) to said toothed ring, said fastening means comprising:

a circumferential coupling region (48, 50, 24a, 50a) for producing a rotationally fixed coupling between the toothed ring (16; 16a) and said at least one component of said cover and said flywheel, said circumferential coupling region (48, 50, 24a, 50a) comprises circumferential retaining sections (48, 50, 24a, 50a) provided on said toothed ring (16; 16a) and said at least one component of said cover and said flywheel, said circumferential retaining sections for bearing against one another in the circumferential direction; and an axial coupling region (54; 54a) for producing an axially fixed coupling between the toothed ring and said at least one component of said cover, said axial coupling region (54; 54a) comprising a retaining ring (54, 54a) adapted to engage said tooth ring (16; 16a) and preventing axial movement of said at least one component of said cover and said flywheel relative to said toothed ring, wherein said axial coupling region (54; 54a) further comprises an axial bearing region (56, 74a) formed on said toothed ring (16; 16a), and said at least one component of said cover further comprises a first axial bearing side (58, 58a) bearing on said axial bearing region (56; 24a) and a second axial bearing side (60; 60a), said retaining ring (54; 54a) bearing against said second axial bearing side (60; 60a).

3. The housing as claimed in claim 2, wherein said circumferential coupling region (48, 50, 24a, 50a) comprises at least one aperture (50; 50a) in the one component, wherein one of said disc driving teeth engage said at least one aperture.

4. The housing as claimed in claim 3; wherein at least one of said plurality of disc-driving teeth (24) projects axially beyond a marginal region (46) and thereby forms said axial bearing region (56) of said toothed ring (16), said at least one of said plurality of teeth (24) axially projecting through said at least one aperture (50).

5. The housing as claimed in claim 4, further comprising a retaining ring location groove (52) formed in said at least one of said plurality of disc-driving teeth (24) in a region projecting beyond said at least one aperture (50).

6. The housing as claimed in claim 5, wherein said retaining ring location groove (52) is radially open to an inside of the multiple disc clutch.

7. The housing as claimed in claim 4, wherein at least every second of said plurality of disc-driving teeth passes through an associated one of said at least one aperture (50) in said at least one component.

8. The housing as claimed in claim 2, wherein said axial bearing region (74a) is formed by at least some of said plurality of disc-driving teeth.

9. The housing as claimed in claim 8, wherein said at least one aperture (50a) in said at least one component is open radially to the outside, and wherein one of said plurality of disc-driving teeth has a greater axial extent than the others and thereby forms said axial bearing region (74a) engaging in said at least one aperture.

10. The housing as claimed in claim 8, further comprising a region (76a) in said toothed ring (16a) axially extending beyond said at least one component.

11. The housing as claimed n claim 9, wherein every second disc-driving tooth of said plurality of disc-driving teeth engages in an associated one of said at least one aperture (50) in said at least one component.

12. The housing as claimed in claim 1, further comprising radial coupling means (62, 64, 78a, 80a) for securing said at least one component to said toothed ring (16; 16a) so as to prevent radial movement relative to said toothed ring (16; 16a).

13. The housing as claimed in claim 12, wherein said radial coupling means (62,64) comprises an axial projection

(64) on one of said at least one component and said toothed ring continuously encircling in the circumferential direction, and an axial offset (62) disposed on the other of said at least one component and said toothed ring continuously encircling in the circumferential direction, said axial projection (64) radially bearing against said axial offset on at least one of an inside and an outside thereof.

14. The housing as claimed in claim 12, wherein at least some of said plurality of disc-driving teeth form said axial bearing region (24a), and said radial coupling means (78a, 80a) comprises one of an axial projection and an axial recess arranged on said at least some of said plurality of disc-driving teeth and a complementary one of the other of said axial projection and said axial recess being arranged on said at least one component for engagement therewith.

15. The housing as claimed in claim 5, wherein said retaining ring (54; 54a) comprises an elastically deformable retaining ring pre-load in a retaining position.

* * * * *